(12) United States Patent
Yang

(10) Patent No.: US 11,413,742 B2
(45) Date of Patent: Aug. 16, 2022

(54) MODULAR ROBOT AND METHOD FOR CALCULATING POSITION OF MODULE UNIT THEREOF

(71) Applicant: Beijing KEYi Technology Co., Ltd., Beijing (CN)

(72) Inventor: Jianbo Yang, Beijing (CN)

(73) Assignee: BEIJING KEYI TECHNOLOGY CO., LTD., Beijing (CN)

( * ) Notice: Subject to any disclaimer, the term of this patent is extended or adjusted under 35 U.S.C. 154(b) by 183 days.

(21) Appl. No.: 16/905,887

(22) Filed: Jun. 18, 2020

(65) Prior Publication Data

US 2020/0391375 A1 Dec. 17, 2020

Related U.S. Application Data

(63) Continuation of application No. PCT/CN2018/121434, filed on Dec. 17, 2018.

(30) Foreign Application Priority Data

Dec. 19, 2017 (CN) .......................... 201711379018.7

(51) Int. Cl.
*B25J 9/08* (2006.01)
*B25J 9/16* (2006.01)
*G08C 21/00* (2006.01)

(52) U.S. Cl.
CPC ............... *B25J 9/08* (2013.01); *B25J 9/1605* (2013.01); *G08C 21/00* (2013.01)

(58) Field of Classification Search
CPC . B25J 9/08; B25J 9/1605; B25J 9/1617; B25J 9/1664; G05B 2219/39103; G08C 21/00
See application file for complete search history.

(56) References Cited

U.S. PATENT DOCUMENTS

| 2002/0111988 | A1 | 8/2002 | Sato | |
|---|---|---|---|---|
| 2015/0127130 | A1 | 5/2015 | Olson | |
| 2020/0306978 | A1* | 10/2020 | Riek | ......................... B25J 9/08 |

FOREIGN PATENT DOCUMENTS

| CN | 106272550 A | 1/2017 |
|---|---|---|
| CN | 108115686 A | 6/2018 |
| CN | 108189029 A | 6/2018 |
| CN | 108326841 A | 7/2018 |
| CN | 108326846 A | 7/2018 |
| CN | 108326847 A | 7/2018 |
| CN | 108356806 A | 8/2018 |

\* cited by examiner

*Primary Examiner* — Dale Moyer
(74) *Attorney, Agent, or Firm* — Andrew C. Cheng

(57) ABSTRACT

The present disclosure relates to the field of modular robot control, and more particularly to a modular robot and a method for calculating a position of a module unit thereof. The modular robot and the position calculation method for module units of the modular robot are characterized in that position information of the module units is determined by recognizing interface identification information of docking parts of adjacent module units, and have the advantage of precise and quick recognition, thereby ensuring the accuracy of a position calculation result of each module unit, and facilitating the widespread application of the modular robot.

9 Claims, 11 Drawing Sheets

MODULAR ROBOT AND METHOD FOR CALCULATING POSITION OF MODULE UNIT THEREOF

TECHNICAL FIELD

The present disclosure relates to the field of modular robot control, and more particularly to a modular robot and a method for calculating a position of a module unit thereof.

BACKGROUND

Robots have been widely used in life and industry, e.g., used for training students' creative thinking skills in teaching and used for welding, spraying, assembling, carrying and other operations in automated production. Although as an execution system, a robot has great flexibility to complete different work tasks, an existing robot often has only one main function for specific use purposes and occasions due to fixed freedom degree and configuration and lack of functional scalability and re-configurability. In addition, it is very expensive to develop a specific robot for each field and each application, which severely restricts the popularization and application of robots. Therefore, a reconfigurable robot comes into being.

The reconfigurable robot is generally obtained by combining a plurality of modules. The existing method for calculating a specific position of each module on the reconfigurable robot has the problems of low calculation speed and poor detection accuracy.

SUMMARY

In view of the above problems, the present disclosure provides a modular robot and a method for calculating a position of a module unit thereof.

A technical solution of the present disclosure for solving the technical problems is to provide a method for calculating a position of a module unit of a modular robot, wherein the modular robot includes at least two module units, each module unit including at least two docking parts; the module units are connected by the respective docking parts; each docking part has unique interface identification information; and the method for calculating the position of the module unit of the modular robot includes the following step:

recognizing configuration information of the modular robot, wherein position information in the configuration information is calculated by recognizing the interface identification information of the docking parts by which adjacent module units are connected.

Preferably, each module unit includes two sub-modules that are movable relatively; and recognizing the configuration information of the modular robot further includes:

recognizing one or more of module type information of the adjacent module units, module quantity information, and initial angle information between the two sub-modules in each module unit.

Preferably, recognizing the configuration information of the modular robot includes: individually numbering the respective module units, and storing the position information of each module unit in association with the corresponding number.

Preferably, the specific process of recognizing the position information of the adjacent module units is as follows:

a module unit sends a signal to at least one module unit directly connected thereto; and the at least one module unit recognizes the interface identification information of the docking part of said module unit that sends the signal, and calculates its position information based on the interface identification information of the docking part of said module unit that sends the signal and the interface identification information of a docking part, which receives the signal, of said at least one module unit itself.

Preferably, the at least two module units include a cell body and at least one single cell body, the single cell body directly connected to the cell body being defined as a first-level single cell body; and recognizing the position information of the adjacent module units specifically includes the following steps:

transmitting a signal by the cell body to the first-level single cell body connected thereto through the docking part;

receiving the signal and then performing face recognition by the first-level single cell body to obtain interface identification information of the docking part, that sends the signal, of the cell body; and transmitting, by the first-level single cell body, the interface identification information of the docking part, that sends the signal, of the cell body and the interface identification information of the docking part, that receives the signal, of said first-level single cell body itself, to the cell body so as to obtain position information of the first-level single cell body.

Preferably, the single cell body connected to the first-level single cell body is defined as a second-level single cell body; the single cell body connected to an $M^{th}$-level single cell body is defined as a $(M+1)^{th}$-level single cell body, M being an integer greater than or equal to 1; and recognizing the position information of the adjacent module units further includes the following steps:

sending a signal by the $M^{th}$-level single cell body to the $(M+1)^{th}$-level single cell body; and receiving the signal and then performing face recognition by the $(M+1)^{th}$-level single cell body to obtain the interface identification information of the docking part, that sends the signal, of the $M^{th}$-level single cell body; and transmitting, by the $(M+1)^{th}$-level single cell body, the interface identification information of the docking part, that sends the signal, of the $M^{th}$-level single cell body and the interface identification information of the docking part, that receives the signal, of said the $(M+1)^{th}$-level single cell body itself to the cell body.

Preferably, when the cell body or single cell body simultaneously sends different electrical signals to a plurality of lower-level single cell bodies, the plurality of lower-level single cell bodies responds to the cell body with their position information based on a time sequence according to the interface identification information of the docking part, that transmits different electrical signals, of the cell body or a higher-level single cell body; or when the cell body or single cell body sends the same or different electrical signals to a plurality of lower-level single cell bodies based on a time sequence, the plurality of lower-level single cell bodies sequentially responds to the cell body with their position information according to a time sequence in which the electrical signals are received.

Preferably, before or at the same time when the first-level single cell body sends an electrical signal, the following step is performed:

stopping sending the electrical signal by the cell body, and instructing by the cell body the first-level single cell body to send the electrical signal to the second-level single cell body.

Preferably, before or at the same time when the cell body transmits the electrical signals, the cell body sends a broadcast signal for instructing all single cell bodies to prepare for face recognition.

The present disclosure further provides a modular robot having a position calculation function, wherein the modular robot includes at least two module units, each module unit including at least two docking parts; the module units are connected by the respective docking parts; each docking part is provided with an interface which has unique interface identification information; the modular robot needs to complete configuration information recognition during or after the assembly process; and position information in the configuration information is calculated by recognizing the interface identification information of the docking parts by which the adjacent module units are connected.

When the method for calculating the position of the module unit of the modular robot is compared with the prior art, the modular robot includes at least two module units, each module unit including at least two docking parts; the module units are connected by the respective docking parts; and each docking part has unique interface identification information. The method for calculating the position of the module unit of the modular robot includes the following step: recognizing configuration information of the modular robot, wherein position information in the configuration information is calculated by recognizing the interface identification information of the docking parts by which adjacent module units are connected. The method for calculating the position of the module unit of the modular robot of the present disclosure is characterized in that the position information of the module units is determined by recognizing the interface identification information of the docking parts of adjacent module units, and has the advantage of precise and quick recognition, thereby ensuring the accuracy of a position calculation result of each module unit, and facilitating the widespread application of the modular robot.

In addition, in this method, the face recognition action is completed by transmitting electrical signals, which further improves the recognition accuracy, is simple and fast, and has low hardware requirements.

In addition, in this method, the single cell bodies respond to the cell body with their position information based on the time sequence, which avoids position calculation errors caused by confusion in the response information, and further ensures the accuracy of the position calculation results.

In addition, in this method, after the single cell bodies make response with their position information, the cell body will individually number the respective single cell bodies and store each number in association with its corresponding position information, thereby further avoiding confusion of information and further ensuring the accuracy of the calculation results.

The modular robot of the present disclosure also has the above-mentioned advantages.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are only used to explain the present disclosure and are not used to limit the present disclosure.

Embodiment 1

Figure 1:
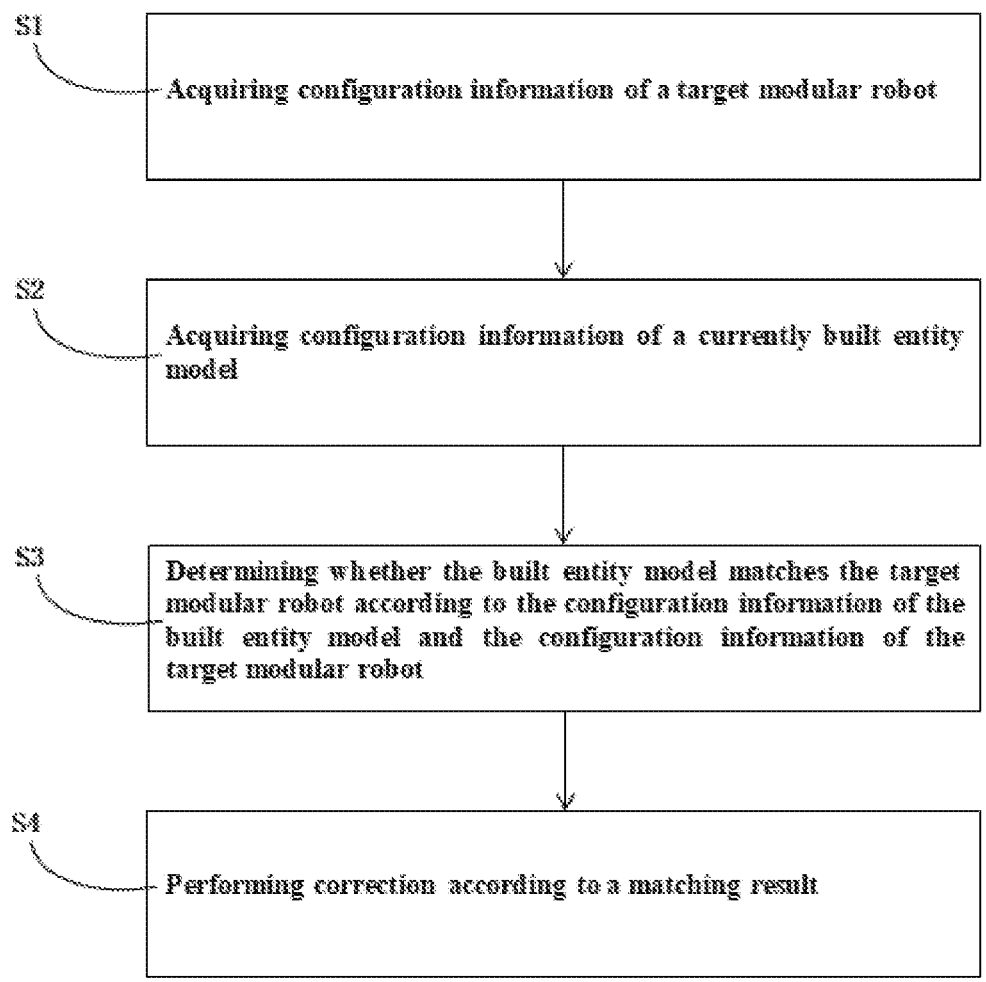
FIG. 1 is a schematic flowchart of a correction method for building a modular robot according to a first embodiment of the present disclosure.

Referring to FIG. 1, a first embodiment of the present disclosure provides a correction method for building a modular robot. The modular robot includes at least two module units, each module unit including two sub-modules that are movable relatively. For example, the two sub-modules are rotatable relatively, especially each module unit being composed of an upper hemisphere and a lower hemisphere that are rotatable relatively. Each sub-module includes at least one docking part, each docking part being provided with an interface, and each interface having unique interface identification information. The module units are connected by the respective docking parts. It may be understood that when each sub-module includes at least two docking parts, the two module units are connected by one docking part of one of the two module units and one docking part of the other of the two module units to form a virtual connection surface at the connection of the two module units. The two module units can rotate based on the virtual connection surface. A plane where at least another docking part on at least one of the two module units is located intersects with the virtual connection surface.

For the sake of the subsequent explanation and understanding, the following definitions are made here. Configuration information includes but is not limited to one or more of module type information, position information, module quantity information, and initial angle information between the two sub-modules. The configuration information is configured to define a connection relationship between adjacent module units. The position information is configured to record interface identification information of the two docking parts by which the adjacent module units are connected, the interface identification information of each docking part representing a position of said docking part on the module unit where it is located. Therefore, the position information of each module unit represents its absolute position in a three-dimensional spatial configuration or planar configuration. Module units of the same type are set with the same module type identifier. For example: cell bodies have the same module type identifier, and single cell bodies have the same module type identifier, the module type identifier of the cell bodies being inconsistent with the module type identifier of the single cell bodies. In the case of a plurality of types of single cell bodies, each type of single cell bodies has the same module type identifier, and different types of single cell bodies have different module type identifiers, such that the module type information of the module units can be obtained by recognizing the module type identifiers. The initial angle information between the two sub-modules refers to a relative angle value between upper and lower sub-modules in each module unit. The module quantity information refers to the quantity of module units. The process of recognizing the interface identification information of the two docking parts by which two adjacent module units are connected to each other between the two adjacent module units refers to a process of face recognition, and the position information of the module units can be obtained by performing the face recognition. It may be understood that the definitions here are also applicable to other embodiments of this specification.

The correction method for building the modular robot includes the following steps:

S1: acquiring configuration information of a target modular robot, the configuration information of the target modular robot including one or more of position information, module type information, and module quantity information of a plurality of module units in the target modular robot;

S2: acquiring configuration information of a currently built entity model, the configuration information of the currently built entity model including one or more of position information, module type information, and module quantity information of a plurality of module units in the currently built entity model;

S3: determining whether the built entity model matches the target modular robot according to the configuration information of the built entity model and the configuration information of the target modular robot; and S4: performing correction according to a matching result.

In the step S1, the configuration information of the target modular robot is derived from a remote terminal, a server or a database in which configuration information corresponding to a plurality of modular robots is stored. The target modular robot is assembled by N module units.

In the step S2, the built entity model is an initial entity configuration that a user intends to assemble a plurality of module units into the target modular robot according to a target configuration of the target modular robot, wherein the initial entity configuration may be an assembled configuration of two or more module units. In general cases, the number of module units of the built entity model is less than or equal to the number N of the module units of the target modular robot. The action of acquiring the configuration information of the built entity model may refer to that a remote terminal acquires position information of each module unit, or one module unit acquires position information of other module units and then transmits the position information to the remote terminal.

Figure 2:
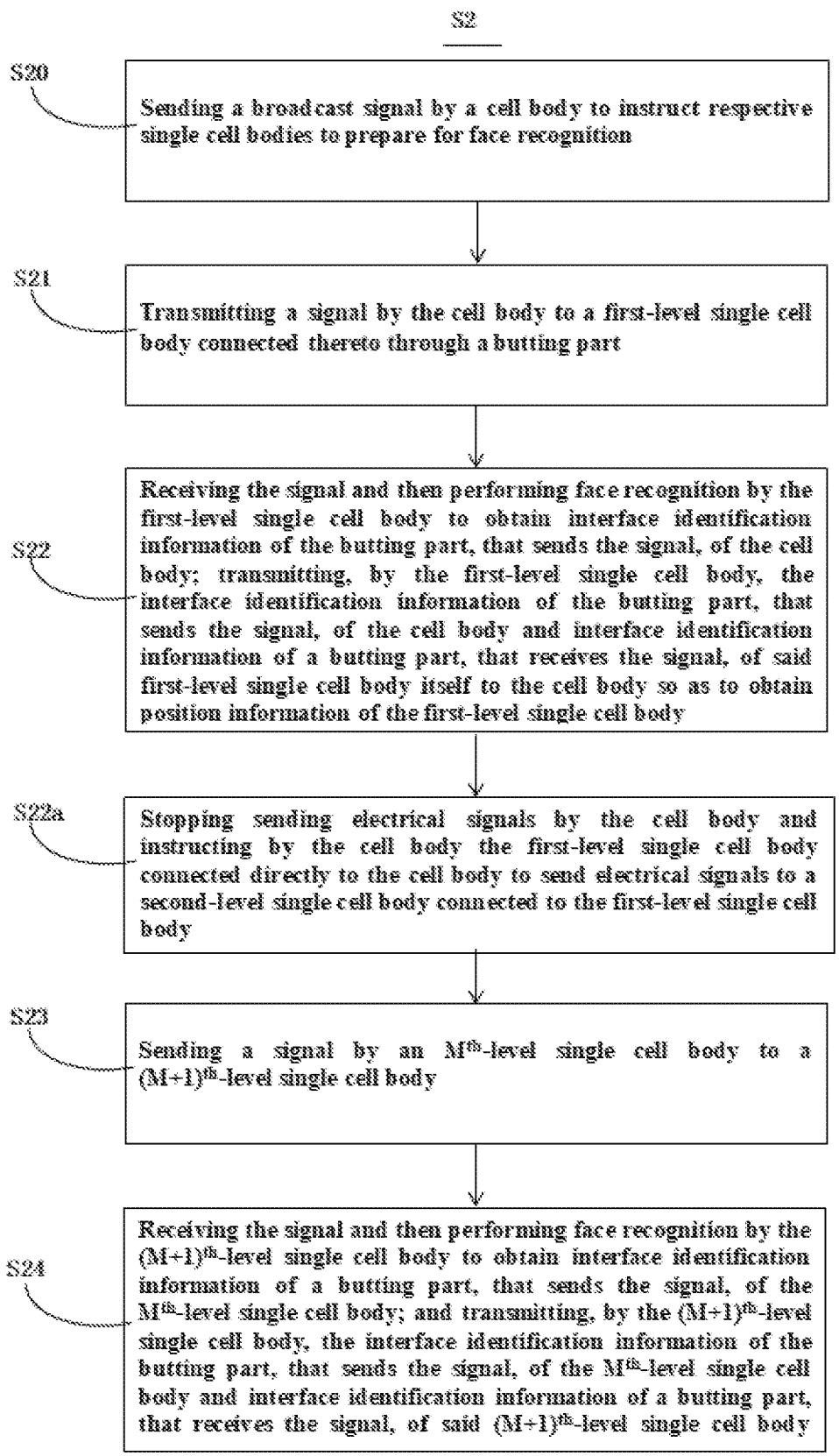
FIG. 2 is a schematic sub-flowchart of step S2 in the correction method for building the modular robot according to the first embodiment of the present disclosure.

Referring to FIG. 2, the plurality of module units of the built entity model may include a plurality of same or different module units. When the plurality of module units of the built entity model includes a plurality of different module units, for example, the plurality of module units of the built entity model includes one cell body and a plurality of single cell bodies, the cell body is configured to communicate with the remote terminal, the single cell body directly connected to the cell body is defined as a first-level single cell body, the single cell body connected to the first-level single cell body is defined as a second-level single cell body, and the single cell body connected to an $M^{th}$-level single cell body is defined as a $(M+1)^{th}$-level single cell body, M being an integer greater than or equal to 1. The configuration information of the built entity model includes module type information, position information and module quantity information. After all single cell bodies transmit their respective position information to the cell body, the cell body obtains the module quantity information of the built entity model. Acquiring the position information of the plurality of module units in the built entity model specifically includes the following steps:

step S21: transmitting a signal by the cell body to the first-level single cell body connected thereto through the docking part;

step S22: receiving the signal and then performing face recognition by the first-level single cell body to obtain the interface identification information of the docking part, that sends a signal, of the cell body; transmitting, by the first-level single cell body, the interface identification information of the docking part, that sends the signal, of the cell body and the interface identification information of the docking part, that receives the signal, of said the first-level single cell body itself to the cell body so as to obtain position information of the first-level single cell body;

step S23: sending a signal by the $M^{th}$-level single cell body to the $(M+1)^{th}$-level single cell body; and step S24: receiving the signal and then performing face recognition by the $(M+1)^{th}$-level single cell body to obtain the interface identification information of the docking part, that sends the signal, of the $M^{th}$-level single cell body; and transmitting, by the $(M+1)^{th}$-level single cell body, the interface identification information of the docking part, that sends the signal, of the $M^{th}$-level single cell body and the interface identification information of the docking part, that receives the signal, of said $(M+1)^{th}$-level single cell body itself to the cell body.

It may be understood that the signal transmitted from the cell body to the first-level single cell body and the signal transmitted from the $M^{th}$-level single cell body to the $(M+1)^{th}$-level single cell body are preferably electrical signals or wireless signals. When the plurality of module units of the built entity model includes only the cell body and the first-level single cell bodies, the steps S23 and S24 may be omitted.

When the plurality of module units of the built entity model includes a plurality of same module units, one of the module units is defined as a main module unit, i.e., the above-mentioned cell body; the module unit directly connected to the main module unit is a first-level single cell body, the module unit connected to the first-level single cell body is defined as a second-level single cell body, and the module unit connected to an $M^{th}$-level single cell body is defined as a $(M+1)^{th}$-level single cell body, M being an integer greater than or equal to 1, the above steps S21 to S24 are also performed. As a variant, a plurality of levels of single cell bodies may directly transmit their respective position information to the remote terminal, without having to transmit them to the main module unit.

In summary, the process of acquiring the position information of the plurality of module units of the built entity model is described as follows: each module unit recognizes the interface identification information of the docking part of the adjacent module unit connected thereto, and obtains its position information based on the interface identification information of the docking part of the adjacent module unit and the interface identification information of the docking part by which said module unit itself is connected to the adjacent module unit.

In addition, the following step is performed before or at the same time with step S21:

step S20: sending broadcast signals by the cell body to instruct the respective single cell bodies to prepare for face recognition. It may be understood that wireless communication may be performed between module units. The wireless communication may be wifi communication, Bluetooth communication, or zigbee communication, preferably zigbee communication. The cell body first instructs respective single cell bodies to enter a face recognition preparation state in a form of broadcast signals, and then performs the face recognition action after the respective single cell bodies receive the electrical signals.

In the step S21, each docking part on the cell body sends different electrical signals to a plurality of first-level single cell bodies. In the step S2, the plurality of first-level single cell bodies obtains interface identification information of the docking parts of the cell body connected thereto according to the received different electrical signals. Each first-level single cell body responds to the cell body with the interface identification information of the docking part, that transmits the electrical signals, of the cell body and the interface identification information of the docking part, that receives the electrical signal, of said first-level single cell body itself. The cell body calculates position information of this first-level single cell body through an algorithm. After the plurality of first-level single cell bodies performs the same action, the cell body obtains position information of the plurality of first-level single cell bodies. In the same way, in the steps S23 and S24, each docking part on the $M^{th}$-level single cell body sends different electrical signals to a plurality of $(M+1)^{th}$-level single cell bodies. The plurality of $(M+1)^{th}$-level single cell bodies obtain interface identification information of the docking parts of the $M^{th}$-level cell body connected thereto according to the received different electrical signals. Each $(M+1)^{th}$-level single cell body responds to the cell body with the interface identification information of the docking part, that transmits the electrical signal, of the $M^{th}$-level single cell body and the interface identification information of the docking part, that receives the electrical signal, of the $(M+1)^{th}$-level cell body itself. The cell body calculates the position information of the $(M+1)^{th}$-level single cell body through an algorithm. After the plurality of $(M+1)^{th}$-level single cell bodies perform the same action, the cell body obtains position information of the plurality of $(M+1)^{th}$-level single cell bodies. After a series of face recognition, the cell body obtains the position information of all single cell bodies, thereby obtaining the configuration information of the built entity model.

It may be understand that, when the cell body or single cell body simultaneously sends different electrical signals to a plurality of lower-level single cell bodies, the plurality of lower-level single cell bodies responds to the cell body with their position information based on a time sequence according to the interface identification information of the docking part, that transmits different electrical signals, of the cell body or a higher-level single cell body; or when the cell body or single cell body sends the same or different electrical signals to a plurality of lower-level single cell bodies based on a time sequence, the plurality of lower-single cell bodies sequentially responds to the cell body with their position information according to a time sequence in which the electrical signals are received. For example, when the cell body is provided with two docking parts, the interface identification information is defined as 1 and 2, respectively, and the cell body simultaneously sends two different electrical signals to two first-level single cell bodies connected thereto, it is set that the first-level single cell body connected to a docking part 1 first makes a response with its position information, and after a wait of 10 s (the specific time may be adjusted), the first-level single cell body connected to a docking part 2 makes a response with its position information.

In addition, there is a step between the steps S22 and S23:

step S22a: stopping sending electrical signals by the cell body, and instructing, by the cell body, the first-level single cell body connected directly to the cell body to send electrical signals to the second-level single cell body connected to the first-level single cell body. It may be understood that, in the step S22a, the cell body preferably instructs the first-level single cell body in a form of broadcast signals. It may be understood that before the $M^{th}$-level single cell body sends electrical signals, the cell body controls the $M^{th}$-level single cell body to send electrical signals to a plurality of $(M+1)^{th}$-level single cell bodies based on a time sequence in a form of broadcast signals according to the interface identification information of a plurality of docking parts of the $M^{th}$-level single cell body. The electrical signals sent by the $M^{th}$-level single cell body to the plurality of $(M+1)^{th}$-level single cell bodies may be the same or different, and it is preferable that the plurality of docking parts of the $M^{th}$-level single cell body sends different electrical signals.

In addition, in the steps S22 and S24, after receiving the position information transmitted from the single cell bodies, the cell body individually numbers the respective single cell bodies, and stores the position information of each single cell body in association with the corresponding number. When the cell body communicates with the remote terminal, the cell body transmits the position information of each single cell body and its number to the remote terminal. After the remote terminal sends action control information to the cell body, the cell body decomposes the control information according to different numbers and transmits the decomposed control information to the respective single cell bodies according to the numbers.

In the step S3, determining whether the built entity model matches the target modular robot refers to determining whether the structure of the built entity model is consistent with the structure of the target modular robot, or the structure of the built entity model is a part of the structure of the target modular robot. It may be understood that, in step S4, an error prompt of module type information is obtained according to the matching result. For example, in the configuration information of the target modular robot, two single cell bodies of the same type should be connected to the cell body, but in the configuration information of the built entity model, two different single cell bodies are connected to the cell body. The cell body may determine an error in the module type information by recognizing module type identifiers of the two single cell bodies, and correspondingly give an error prompt, such as highlighting single cell bodies that are assembled incorrectly in a specific color, or giving a prompt that single cell bodies are assembled incorrectly with a specific symbol, or sending a prompt tone indicating that the module type information is incorrect. It may be understood that the error prompt may be displayed through a display interface arranged on the cell body; or displayed on a display interface of the remote terminal connected to the cell body; or displayed throughout the overall shape of the single cell bodies; or displayed on the docking parts by which one single cell body is connected with another single cell body.

Figure 3:
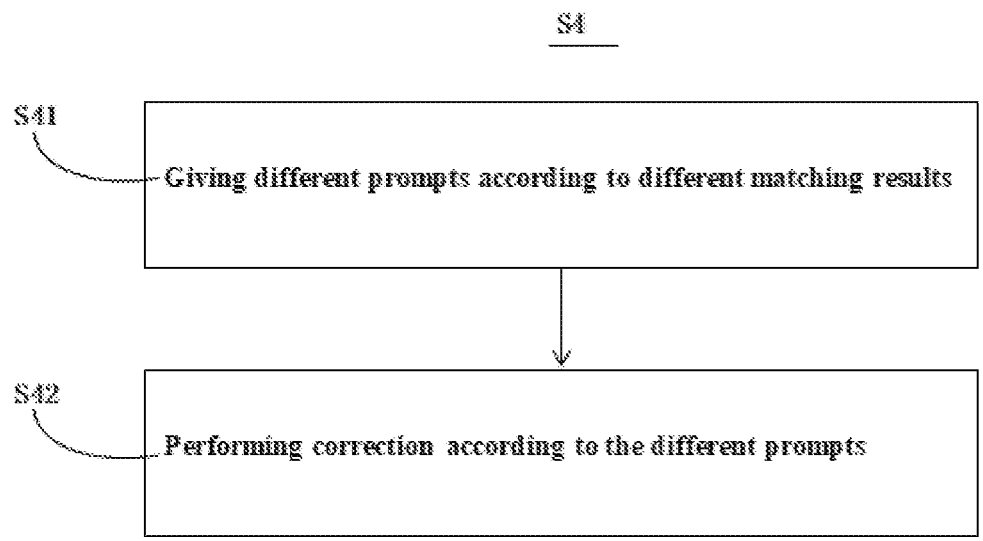
FIG. 3 is a schematic sub-flowchart of step S4 in the correction method for building the modular robot according to the first embodiment of the present disclosure.

Referring to FIG. 3, the step S4 specifically includes the following steps:

S41: giving different prompts according to different matching results; and

S42: performing correction according to the different prompts.

It may be understood that after one module unit is assembled each time, the configuration information of the built entity model is acquired, matched with the configuration information of the target modular robot, and then corrected according to the matching result; or after all the module units are assembled, the configuration information of the built entity model is acquired at one time, matched with the configuration information of the target modular robot, and then corrected according to the matching result.

It may also be understood that a virtual connection surface is present at the connection of two sub-modules in each module unit. The two virtual connection surfaces of the two connected module units of the target modular robot are parallel and intersected in direction. The error types of the position information include a position error and a direction error. For the sake of subsequent description, the two sub-modules in each module unit are defined as a sub-module 1 and a sub-module 2, wherein four docking parts 1, 3, 5, and 7 are provided on the sub-module 1, four docking parts of 2, 4, 6, and 8 are provided on the sub-module 2, and the four docking parts on each of the sub-module 1 and the sub-module 2 are symmetrical. For example, in the case that the existing module unit A and module unit B are connected, in the configuration information of the target modular robot, the module unit B should be connected to the docking part 1 on the module unit A, but in the built entity model, the module unit A is connected to another docking part on the module unit B, thereby causing a position error. For another example, for the existing module unit C and module unit D are connected, in the configuration information of the target modular robot, the docking part 1 of the module unit C should be connected to the docking part 1 of the module unit D, and in this case, a virtual connection surface of the module unit C is parallel to a virtual connection surface of the module unit D, but in the built entity model, the docking part 2 of the module unit C is connected to the docking part 1 of the module unit D, so that the virtual connection surface of the module unit C intersects with the virtual connection surface of the module unit D, thereby causing a direction error. However, as long as the selected docking part of the module unit D is consistent with the configuration information of the target modular robot, and the four docking parts on the module unit C are symmetrical, when the docking part on the module unit D is selected correctly and the module unit C is then connected to the module unit D, the virtual connection surface of the module unit C and the vertical connection surface of the module unit D are parallel or intersected in the case that four docking parts on the same sub-module are connected to the module unit D. Therefore, when the three docking parts 3, 5, and 7 on the module unit C are connected to the docking part 1 on the module unit D respectively, the virtual connection surface of the module unit C and the virtual connection surface of the module unit D are also parallel. Moreover, after the sub-module 1 is adjusted by servo to a certain angle, the configuration information of the built entity model is consistent with the configuration information of the target modular robot. That is, in the case of no position error, when four docking parts on the same sub-module are connected to the adjacent module unit, the sub-module can be adjusted by servo to be consistent with the configuration information of the target modular robot.

In summary, the position error refers to that when a single cell body to be assembled is connected to an upper-level single cell body or a cell body, a selection error is caused when the docking parts on the upper-level single cell body or the cell body are selected. The direction error refers to that the directions of two virtual connection surfaces of the two connected module units in the target modular robot are parallel, while the directions of two virtual connection surfaces of the two correspondingly connected module units in the built entity model are intersected; or the directions of the two virtual connection surfaces of two connected module units in the target modular robot are intersected, while the directions of two virtual connection surfaces of the two correspondingly connected module units in the built entity model are parallel.

Embodiment 2

Figure 4:
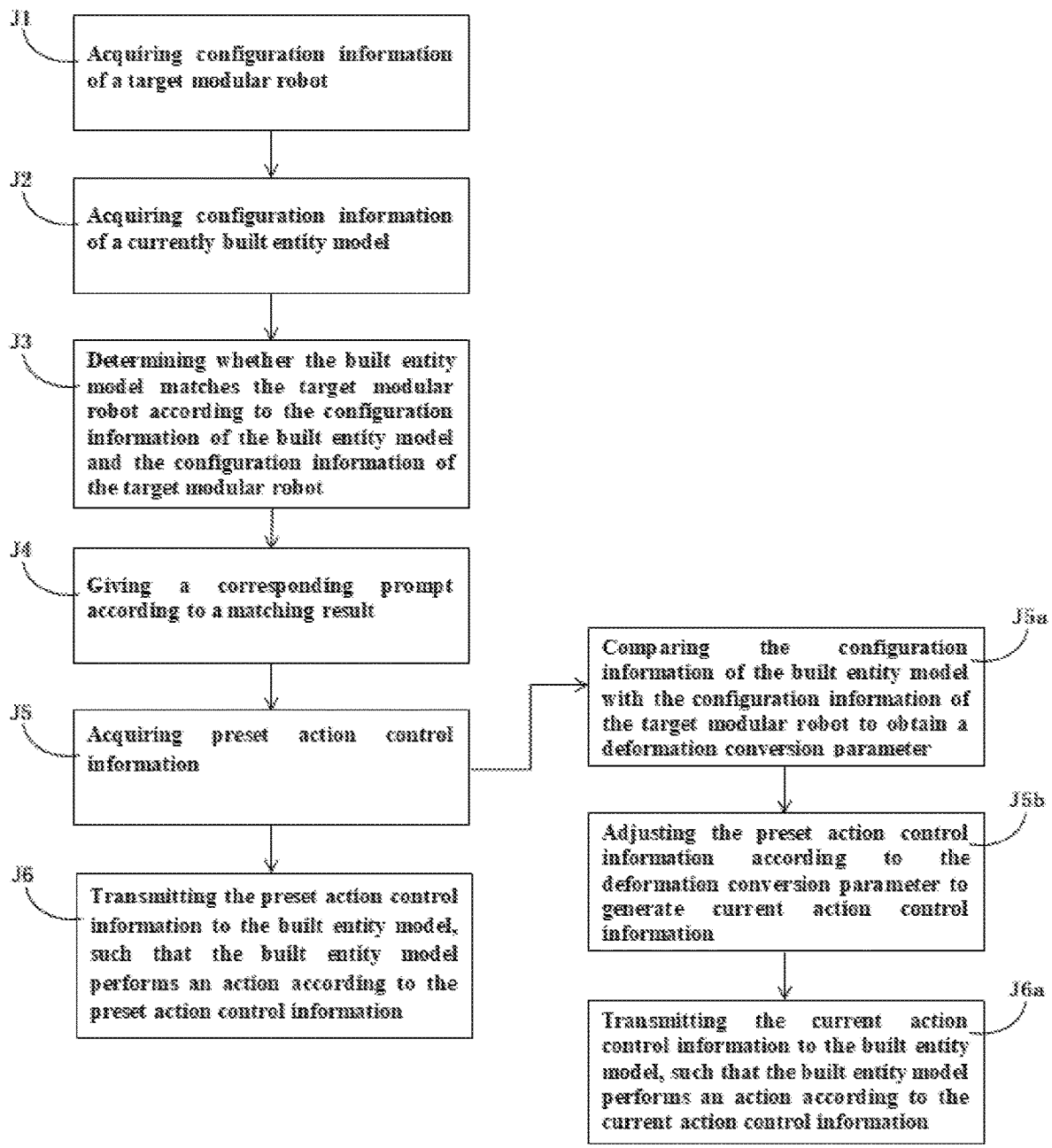
FIG. 4 is a schematic flowchart of a control method for a modular robot according to a second embodiment of the present disclosure.

Referring to FIG. 4, a second embodiment of the present disclosure further provides a control method for a modular robot, which includes the correction method for building the modular robot in the first embodiment. When a matching structure shows that the built entity model is completely consistent with the target modular robot, the control method for the modular robot further includes the following steps:

J5: acquiring preset action control information; and

J6: transmitting the preset action control information to the built entity model, such that the built entity model performs an action according to the preset action control information.

It may be understood that the preset action control information is correspondingly stored in the remote terminal or the cell body according to the configuration information of the target modular robot.

It may be understood that, in the step J6, since the cell body individually numbers the respective single cell bodies after receiving position information transmitted from all single cell bodies, and stores the position information of each single cell body in association with the corresponding number, when the remote terminal transmits the preset action control information to the cell body, the cell body decomposes the preset action control information according to the numbers, and correspondingly transmits a part of the preset action control information to the single cell bodies according to the numbers, and the single cell bodies perform specified actions according to the received part of the preset action control information.

When a configuration of the built entity model is identical with a target configuration of the target modular robot, there may be a case where the docking parts are connected differently. In this case, it will be determined as being result-matched in the correction method for building the modular robot in the first embodiment, but the preset action control information corresponds exactly to the configuration information of the target modular robot, the built entity model may not be able to perform some or all actions according to the preset action control information. Therefore, the following steps may also be performed after step J5:

J5a: comparing the configuration information of the built entity model with the configuration information of the target modular robot to obtain a deformation conversion parameter;

J5b: adjusting the preset action control information according to the deformation conversion parameter to generate current action control information; and J6a: transmitting the current action control information to the built entity model, such that the built entity model performs an action according to the current action control information.

In this case, step J6 is omitted.

Embodiment 3

Figure 5:
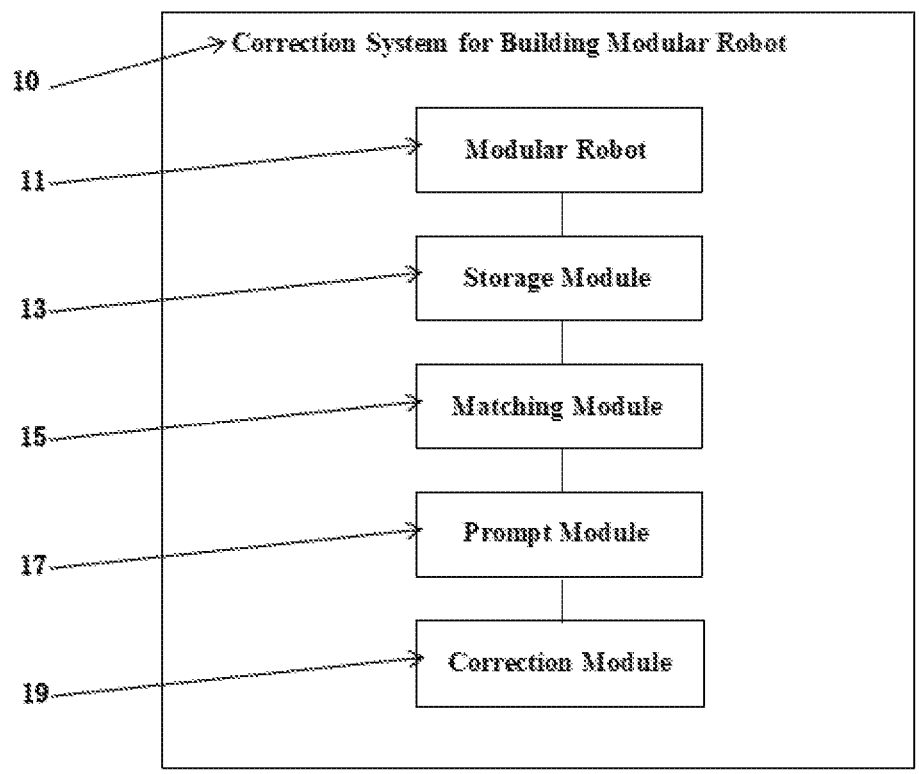
FIG. 5 is a schematic diagram of a module structure of a correction system for building a modular robot according to a third embodiment of the present disclosure.

Referring to FIG. 5, a third embodiment of the present disclosure further provides a correction system 10 for building the modular robot. The correction system 10 for building the modular robot includes:

a modular robot 11, which includes at least two module units, each module unit including two sub-modules that are movable relatively, each sub-module including at least one docking part, and the module units being connected by the docking parts;

a storage module 13 configured to store configuration information of a target modular robot and configuration information of a built entity model, the configuration information of the target modular robot including one or more of position information, module type information, and module quantity information of a plurality of module units in the target modular robot, and the configuration information of the built entity model including one or more of position information, module type information and module quantity information of a plurality of module units in the built entity model;

a matching module 15 configured to determine whether the built entity model matches the target modular robot according to the configuration information of the built entity model and the configuration information of the target modular robot; and a correction module 19 configured to perform correction according to a matching result.

The built entity model is an initial entity configuration that a user intends to assemble a plurality of module units into the target modular robot according to a target configuration of the target modular robot, wherein the modular robot 11 forms the built entity model during an assembly process. The storage module 13 is connected to the modular robot 11 to store the configuration information of the built entity model. The matching module 15 is connected to the storage module 13 to retrieve the configuration information of the built entity model and the configuration information of the target modular robot from the storage module 13. The correction module 19 is connected to the matching module 15 to perform correction according to the matching result given by the matching module 15. It may be understood that the storage module 13 is also configured to be connected with a remote terminal or a server, and acquire the configuration information of the target modular robot from the remote terminal or the server.

In addition, the correction system 10 for building the modular robot further includes a prompt module 17. The prompt module 17 is connected to the matching module 15 and the correction module 19. The prompt module 17 gives different prompts according to different matching results given by the matching module 15. The correction module 19 correspondingly performs correction according to the different prompts given by the prompt module 17.

Embodiment 4

Figure 6:
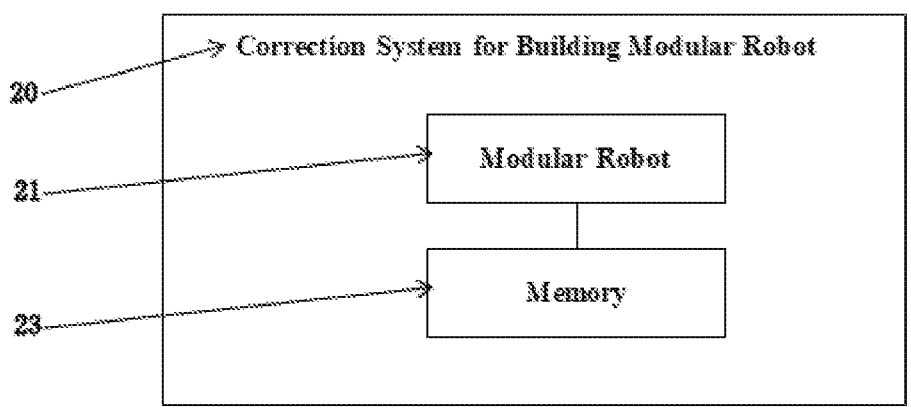
FIG. 6 is a schematic diagram of a module structure of a correction system for building a modular robot according to a fourth embodiment of the present disclosure.

Referring to FIG. 6, a fourth embodiment of the present disclosure further provides a correction system 20 for building a modular robot. The correction system 20 for building the modular robot includes:

a modular robot 21, which includes at least two module units, each module unit including two sub-modules that are movable relatively, each sub-module including at least one docking part, and the module units being connected by the docking parts; and a memory 23, and one or more programs stored in the memory, the memory communicating with the module unit, and the programs being configured to perform the following step instructions:

S1: acquiring configuration information of a target modular robot, the configuration information of the target modular robot including one or more of position information, module type information, and module quantity information of a plurality of module units in the target modular robot;

S2: acquiring configuration information of a currently built entity model, the configuration information of the currently built entity model including one or more of position information, module type information, and module quantity information of a plurality of module units in the currently built entity model;

S3: determining whether the built entity model matches the target modular robot according to the configuration information of the built entity model and the configuration information of the target modular robot; and S4: performing correction according to a matching result.

The built entity model is an initial entity configuration that a user intends to assemble a plurality of module units into the target modular robot according to a target configuration of the target modular robot, wherein the modular robot 11 forms the built entity model during the assembly process. The memory 23 is connected to the modular robot 21 to acquire configuration information of the built entity model.

It may be understood that each of the plurality of module units includes a cell body and at least one single cell body. Each docking part has unique identification information. The single cell body directly connected to the cell body is defined as a first-level single cell body. Acquiring the position information of the plurality of module units in the built entity model in the step S2 includes the following steps:

step S21: transmitting a signal by the cell body to the first-level single cell body connected thereto through the docking part;

step S22: receiving the signal and then performing face recognition by the first-level single cell body to obtain interface identification information of the docking part, that sends the signal, of the cell body; transmitting, by the first-level single cell body, the interface identification information of the docking part, that sends the signal, of the cell body and interface identification information of the docking part, that receives the signal, of said first-level single cell body itself to the cell body so as to obtain position information of the first-level single cell body;

step S23: sending a signal by an $M^{th}$-level single cell body to a $(M+1)^{th}$-level single cell body: and step S24: receiving the signal and then performing face recognition by the $(M+1)^{th}$-level single cell body to obtain interface identification information of the docking part, that sends the signal, of the $M^{th}$-level single cell body; and transmitting, by the $(M+1)^{th}$-level single cell body, the interface identification information of the docking part, that sends the signal, of the $M^{th}$-level single cell body and interface identification information of the docking part, that receives the signal, of said $(M+1)^{th}$-level single cell body itself to the cell body.

It may be understood that when the plurality of module units of the built entity model includes only the cell body and the first-level single cell bodies, the steps S23 and S24 may be omitted.

Embodiment 5

Figure 7:
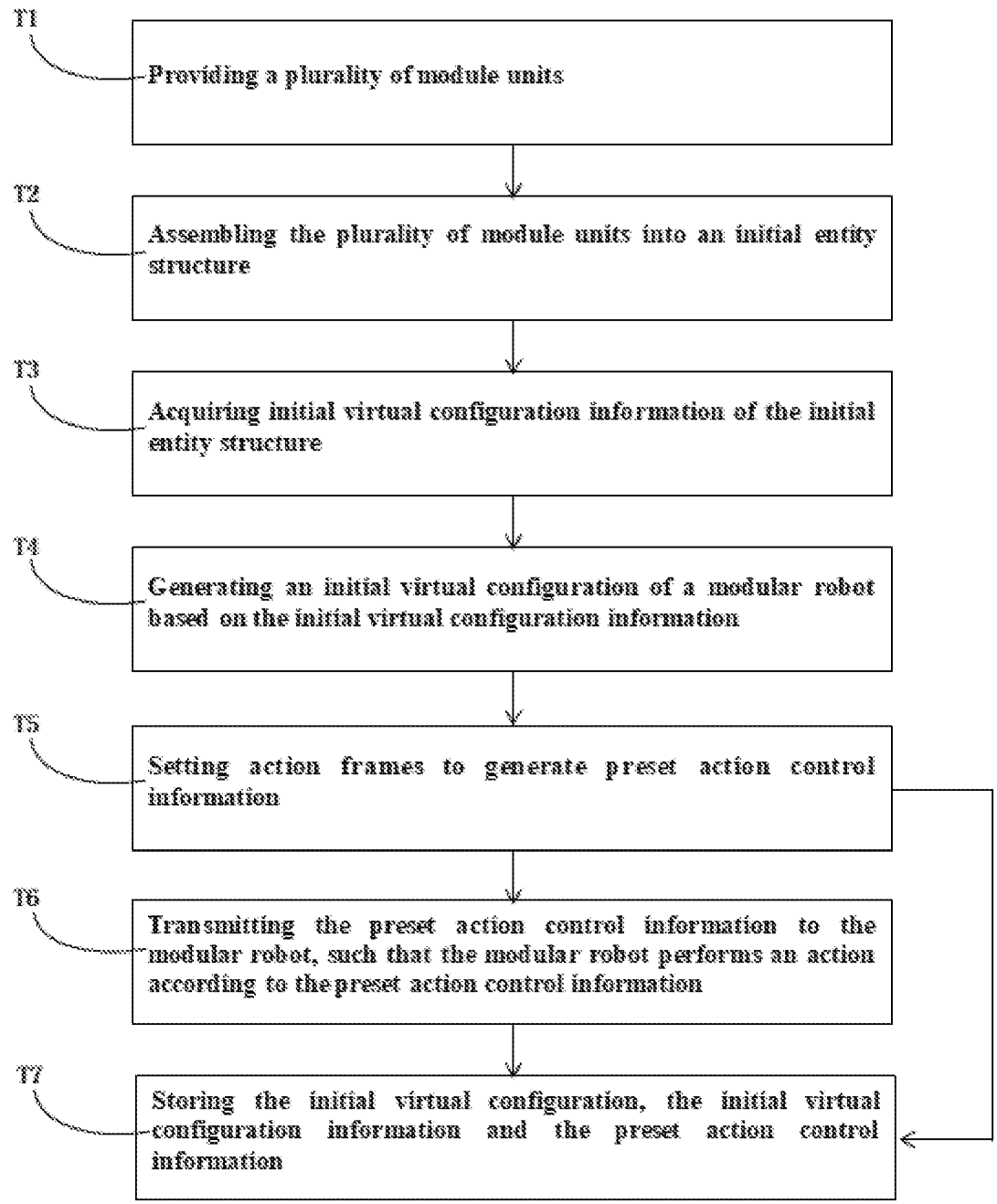
FIG. 7 is a schematic flowchart of a control method for a modular robot according to a fifth embodiment of the present disclosure.

Referring to FIG. 7, the first embodiment of the present disclosure further provides a control method for a modular robot. The modular robot includes at least two module units, each module unit including two sub-modules that are movable relatively. For example, the two sub-modules are rotatable relatively. Preferably, each module unit is composed of an upper hemisphere and a lower hemisphere that are rotatable relatively. Each sub-module includes at least one docking part, wherein each docking part is provided with an interface, each interface having unique interface identification information. The module units are connected by docking parts. It may be understood that when each sub-module includes at least two docking parts, the two module units are connected by one docking part of one of the two module units and one docking part of the other of the two module units to form a virtual connection surface at the connection of the two module units. The two module units can rotate based on the virtual connection surface. A plane where at least another docking part on at least one of the two module units is located intersects with said virtual connection surface.

For the sake of the subsequent explanation and understanding, the following definitions are made here. Configuration information includes but is not limited to one or more of module type information, position information, module quantity information, and initial angle information between two sub-modules. The configuration information is configured to define a connection relationship between adjacent module units. The position information is configured to record interface identification information of the two docking parts by which the adjacent module units are connected, the interface identification information of each docking part representing a position of said docking part on the module unit where it is located. Therefore, the position information of each module unit represents its absolute position in a three-dimensional spatial configuration or planar configuration. Module units of the same type are set with the same module type identifier. For example: the cell bodies have the same module type identifier, and the single cell bodies have the same module type identifier, the module type identifier of the cell bodies being inconsistent with the module type identifier of the single cell bodies. When there is a plurality of types of single cell bodies, each type of single cell bodies has the same module type identifier, and different types of single cell bodies have different module type identifiers, such that the module type information of the module units can be obtained by recognizing the module type identifiers. The initial angle information between two sub-modules refers to a relative angle value between upper and lower sub-modules in each module unit. The module quantity information refers to the quantity of the module units. The process of recognizing the interface identification information of two docking parts by which two adjacent module unit are connected to each other between the two adjacent module units refers to a process of face recognition, and the position information of the module units can be obtained by performing the face recognition. It may be understood that the definitions here are also applicable to other embodiments of this specification.

The control method for the modular robot includes the following steps:

T1: providing a plurality of module units;

T2: assembling the plurality of module units into an initial entity structure;

T3: acquiring initial virtual configuration information of the initial entity structure;

T4: generating an initial virtual configuration of the modular robot based on the initial virtual configuration information;

T5: setting action frames to generate preset action control information; and

T6: transmitting the preset action control information to the modular robot, such that the modular robot performs an action according to the preset action control information.

It may be understood that, in the step S1, the plurality of provided module units may include at least one module unit that communicates with a remote terminal, thereby achieving the communication between the modular robot and the remote terminal. In addition, when the modular robot itself can perform the operations of the subsequent steps without communicating with the remote terminal, the plurality of provided module units include at least one module unit that can perform the subsequent steps.

It may be understood that in the step T2, a plurality of module units is assembled into a modular robot, and the specific structure of the modular robot is the initial entity structure.

It may be understood that in the step T3, the initial entity structure may be uploaded to the remote terminal to acquire the initial virtual configuration information of the initial entity structure. At least one module unit uploads the initial entity structure of the assembled modular robot to the remote terminal. The remote terminal obtains the initial virtual configuration information of the initial entity structure; or at least one of the plurality of module units acquires the initial virtual configuration information of the initial entity structure and stores the initial virtual configuration information, instead of transmitting the initial virtual configuration information to the remote terminal. The initial virtual configuration information includes one or more of position information, module type information, module quantity information, initial angle information between upper and lower sub-modules, and other information that defines a connection relationship between adjacent module units. Each module unit transmits its own module type information to the cell body wirelessly. After all the module units transmit their position information to the remote terminal, the remote terminal obtains the module quantity information of the initial entity structure. Each module unit detects the initial angle of the upper and lower sub-modules thereof and wirelessly transmits the initial angle information to the remote terminal.

Figure 8:
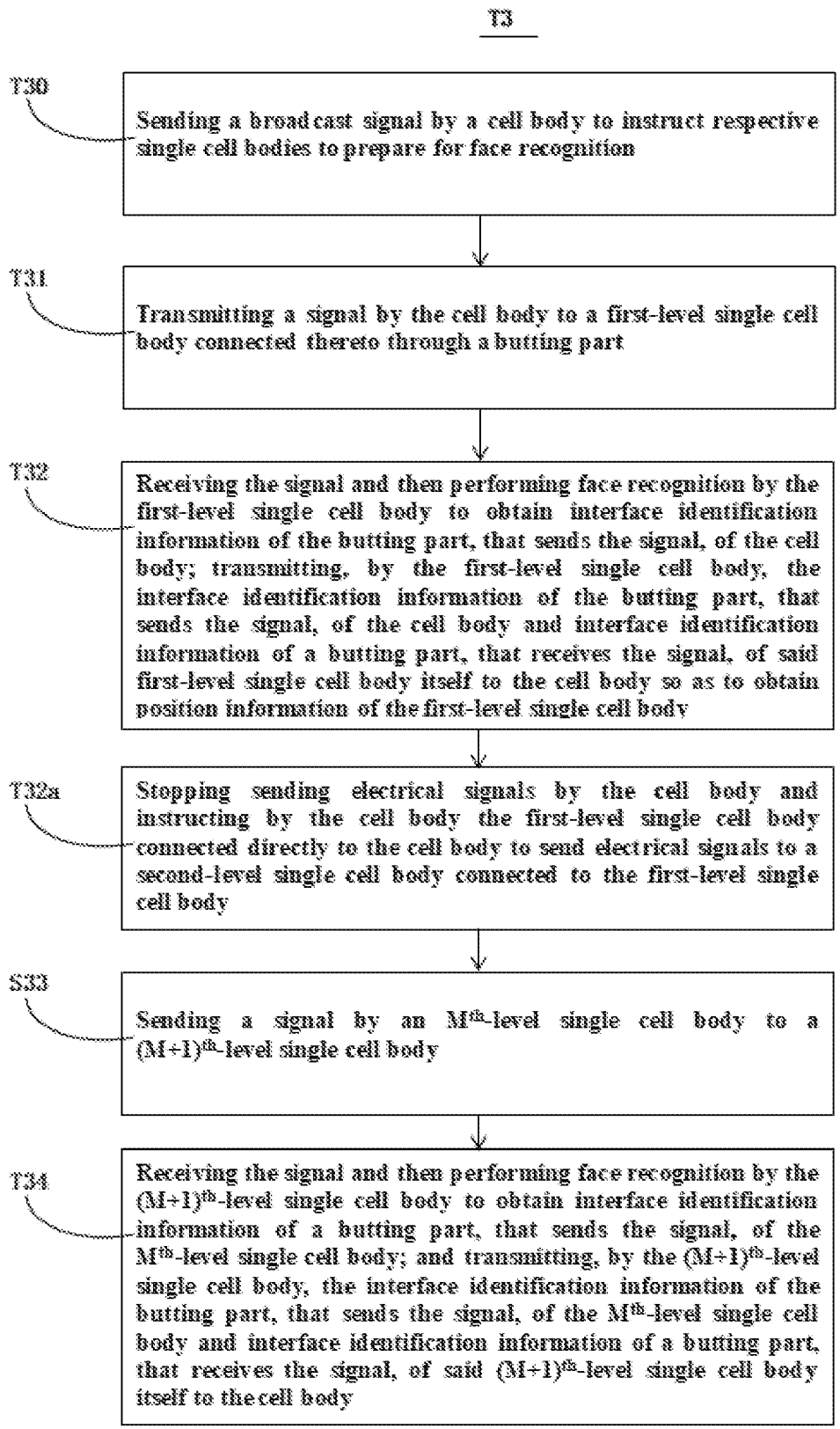
FIG. 8 is a schematic sub-flowchart of step T3 in the control method for the modular robot according to the fifth embodiment of the present disclosure.

Referring to FIG. 8, the plurality of module units of the initial entity structure may include a plurality of same or different module units. The plurality of module units includes at least one module unit that can communicate with the remote terminal. When the plurality of module units of the initial entity structure includes a plurality of different module units, for example, the plurality of module units includes a cell body and at least one single cell body, the cell body is configured to communicate with the remote terminal, the single cell body directly connected to the cell body is defined as a first-level single cell body, the single cell body connected to the first-level single cell body is defined as a second-level single cell body, and the single cell body connected to an $M^{th}$-level single cell body is defined as a $(M+1)^{th}$-level single cell body, M being an integer greater than or equal to 1. Acquiring the initial virtual configuration information of the initial entity structure includes the following steps:

T31: transmitting a signal by the cell body to the first-level single cell body connected thereto through the docking part;

T32: receiving the signal and then performing face recognition by the first-level single cell body to obtain the interface identification information of the docking part, that sends the signal, of the cell body; transmitting, by the first-level single cell body, the interface identification information of the docking part, that sends the signal, of the cell body and the interface identification information of the docking part, that receives the signal, of said first-level single cell body itself to the cell body so as to obtain position information of the first-level single cell body;

T33: sending a signal by the $M^{th}$-level single cell body to the $(M+1)^{th}$-level single cell body; and T34: receiving the signal by and then performing face recognition the $(M+1)^{th}$-level single cell body to obtain the interface identification information of the docking part, that sends the signal, of the $M^{b}$-level single cell body; and transmitting, by the $(M+1)^{th}$-level single cell body, the interface identification information of the docking part, that sends the signal, of the $M^{th}$-level single cell body and the interface identification information of the docking part, that receives the signal, of said $(M+1)^{th}$-level single cell body itself to the cell body.

It may be understood that the signal transmitted from the cell body to the first-level single cell body and the signal transmitted from the $M^{th}$-level single cell body to the $(M+1)^{th}$-level single cell body are preferably electrical signals or wireless signals. When the initial entity structure includes only the cell body and the first-level single cell body, the steps T33 and T34 may be omitted.

When the plurality of module units of the initial entity structure includes a plurality of same module units, one of the module units is defined as a main module unit, i.e., the above-mentioned cell body; the module unit directly connected to the main module unit is defined as a first-level single cell body, the module unit connected to the first-level single cell body is defined as a second-level single cell body, and the module unit connected to the $M^{th}$-level single cell body is defined as the $(M+1)^{th}$-level single cell body, M being an integer greater than or equal to 1, the above steps S31 to T34 are also performed. As a variant, a plurality of levels of single cell bodies may directly transmit their respective position information to the remote terminal, without having to transmit them to the main module unit.

In summary, the process of acquiring the position information of the plurality of module units of the initial entity structure is described as follows: each module unit recognizes the interface identification information of the docking part of the adjacent module unit connected thereto, and obtains its position information based on the interface identification information of the docking part of the adjacent module unit and the interface identification information of the docking part by which said module unit itself is connected to the adjacent module unit.

In addition, the following step is performed before or at the same time with step T31:

step S30: sending, by the cell body, a broadcast signal for instructing the respective single cell bodies to prepare for face recognition. It may be understood that wireless communication may be performed between module units. The wireless communication may be wifi communication, Bluetooth communication, or zigbee communication, preferably zigbee communication. The cell body first instructs respective single cell bodies to enter a face recognition preparation state in a form of broadcast signals, and then performs the face recognition action after the respective single cell bodies receive electrical signals.

In the step T31, each docking part on the cell body sends different electrical signals to a plurality of first-level single cell bodies. In the step S32, the plurality of first-level single cell bodies obtains interface identification information of the docking parts of the cell body connected thereto according to the received different electrical signals. Each first-level single cell body responds to the cell body with the interface identification information of the docking part, that transmits the electrical signals, of the cell body and the interface identification information of the docking part, that receives the electrical signals, of said first-level single cell body itself. The cell body calculates the position information of this first-level single cell body through an algorithm. After the plurality of first-level single cell bodies performs the same action, the cell body obtains position information of the plurality of first-level single cell bodies. In the same way, in the steps T33 and T34, each docking part on the $M^{th}$-level single cell bodies sends different electrical signals to a plurality of $(M+1)^{th}$-level single cell bodies. The plurality of $(M+1)^{th}$-level single cell bodies obtains interface identification information of the docking parts of the $M^{th}$-level single cell bodies connected thereto according to the received different electrical signals. Each $(M+1)^{th}$-level single cell body responds to the cell body with the interface identification information of the docking part, that transmits the electrical signals, of the $M^{th}$-level single cell body and the interface identification information of the docking part, that receives the electrical signals, of said $(M+1)^{th}$-level single cell body itself. The cell body calculates the position information of this $(M+1)^{th}$-level single cell body through an algorithm. After the plurality of $(M+1)^{th}$-level single cell bodies perform the same action, the cell body obtains position information of the plurality of $(M+1)^{th}$-level single cell bodies. After a series of face recognition, the cell body obtains the position information of all single cell bodies, thereby obtaining the configuration information of the initial entity structure.

It may be understand that, when the cell body or single cell body simultaneously sends different electrical signals to a plurality of lower-level single cell bodies, the plurality of lower-level single cell bodies responds to the cell body with their position information in a time sequence according to the interface identification information of the docking parts, that transmit different electrical signals, of the cell body or the higher-level single cell body; or when the cell body or single cell body sends the same or different electrical signals to a plurality of lower-level single cell bodies in a time sequence, the plurality of lower-level single cell bodies sequentially responds to the cell body with their position information according to a time sequence in which the electrical signals are received. For example: when the cell body is provided with two docking parts, the interface identification information is defined as 1 and 2, respectively, and the cell body simultaneously sends two different electrical signals to the two first-level single cell bodies connected thereto, it is set that the first-level single cell body connected to a docking part 1 first makes a response with its position information, and after a wait of 10 s (the specific time may be adjusted), the first-level single cell body connected to a docking part 2 makes a response with its position information.

In addition, there is a step between the steps S32a and S33a:

step S32a: stopping sending the electrical signals by the cell body, and instructing by the cell body the first-level single cell body connected directly to the cell body to send electrical signals to the second-level single cell body connected to the first-level single cell body. It may be understood that, in the step S22a, the cell body preferably instructs the first-level single cell bodies in a form of broadcast signals. It may also be understood that before the $M^{th}$-level single cell body sends the electrical signals, the cell body controls the $M^{th}$-level single cell body to send electrical signals to a plurality of $(M+1)^{th}$-level single cell bodies based on a time sequence in a form of broadcast signals according to the interface identification information of a plurality of docking parts of the $M^{th}$-level single cell body. The electrical signals sent by the $M^{th}$-level single cell bodies to the plurality of $(M+1)^{th}$-level single cell bodies may be the same or different, and it is preferable that the plurality of docking parts of each $M^{th}$-level single cell body sends different electrical signals.

In addition, in the steps T32 and T34, after receiving the position information transmitted from the single cell bodies, the cell body individually numbers the respective single cell bodies, and stores the position information of each single cell body in association with the corresponding number. When the cell body communicates with the remote terminal, the cell body transmits the position information of each single cell body and its number to the remote terminal. After the remote terminal sends action control information to the cell body, the cell body decomposes the control information according to different numbers and correspondingly transmits the decomposed control information to the respective single cell bodies according to the numbers.

It may be understood that, in the step T4, the remote terminal or the module unit in which the initial virtual configuration information in the step T3 is stored generates an initial virtual configuration of the modular robot according to the initial virtual configuration information. The remote terminal generates the initial virtual configuration of the modular robot through three-dimensional simulation or three-dimensional modeling according to the obtained initial virtual configuration information.

Figure 9:
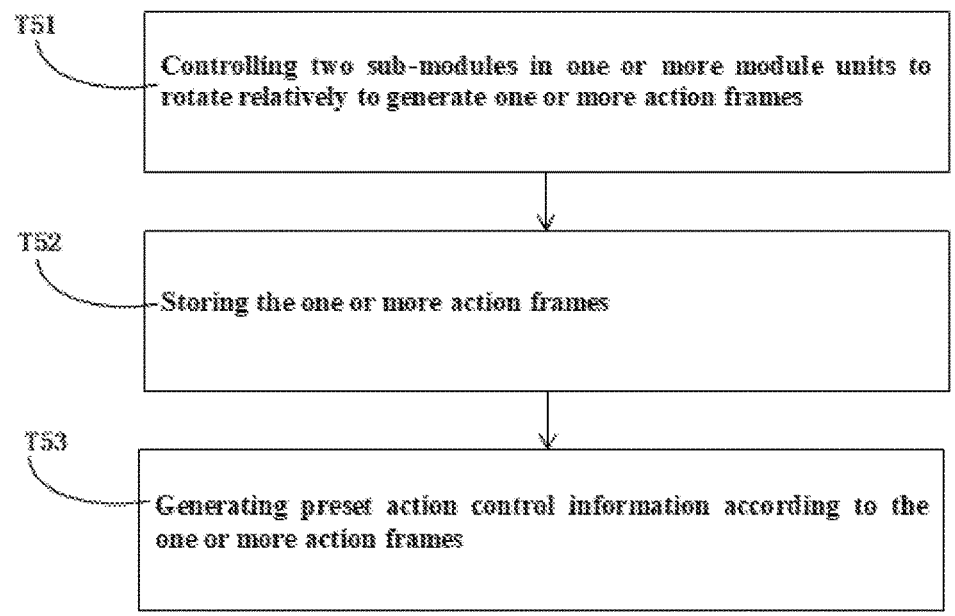
FIG. 9 is a schematic sub-flowchart of step T5 in the control method for the modular robot according to the fifth embodiment of the present disclosure.

Referring to FIG. 9, the step T5 specifically includes the following steps:

T51: controlling two sub-modules in one or more module units to rotate relatively to generate one or more action frames;

T52: storing the one or more action frames; and

T53: generating preset action control information according to the one or more action frames.

It may be understood that, in the steps T51 and T52, controlling the two sub-modules in one or more module units to rotate relatively may be performed in the initial entity structure, or may be performed in the initial virtual configuration. For example, two sub-modules of one single cell body may be controlled to rotate relatively by a certain angle on the entity configuration of the modular robot. This single cell body may detect a relative rotation angle value of the two sub-modules and transmit it to the cell body. The cell body transmits this angle value, together with the number of this single cell body and/or the position information of this single cell body to the remote terminal. The remote terminal determines an identity of this single cell body according to the number of this single cell body and/or the position information of this single cell body, retrieves the initial angle information of the two sub-modules of this single cell body, calculates the relative angle information between the two sub-modules after the rotation in combination with this rotation angle value, and saves the process from the initial angle position to the current angle position as an action frame. Two sub-modules of another single cell body are then rotated, or two sub-modules of the same single cell body are continuously rotated. After the same information transmission and calculation processing, the remote terminal saves this process as another action frame, thereby forming a plurality of action frames. Also for example: two sub-modules in one or more module units may be chosen from the initial virtual configuration of the modular robot generated by the remote terminal to rotate by a certain angle and this process is saved as an action frame; and another single cell body or the same single cell body is continuously selected to rotate by a certain angle to form another action frame, thereby obtaining a plurality of action frames.

It may be understood that the step T53 is specifically as follows:

adding, deleting or editing one or more action frames to generate the preset action control information. It may be understood that, in the remote terminal, one or more of a rotation time, a rotation speed, a rotation angle, and a rotation direction of each action frame may be edited. For example: one or more action frames may be selected on an operation interface of the remote terminal. After one of the action frames is selected, it is possible to edit one or more parameters of the rotation angle, the rotation direction, the rotation time, and the rotation speed of this action frame. Alternatively, it is also possible to edit the sequence of the plurality of action frames to finally generate the preset action control information.

In the step T6, after the remote terminal transmits the preset action control information to the cell body, the cell body decomposes the preset action control information according to the numbers of different single cell bodies, and transmits part of the decomposed preset action control information to the corresponding single cell body according to different numbers. The single cell body performs actions after receiving the part of the preset action control information. It may be understood that the single cell body monitors the relative angle information between its two sub-modules in real time during the execution of the actions, and determines whether the action is completed according to the detection result. Preferably, after the single cell body determines that the actions are completed, the single cell body transmits a signal to the cell body. The cell body transmits the signal to the remote terminal to inform the single cell body that the actions have been completed; or the single cell body directly transmits the signal to the remote terminal.

Referring to FIG. 7 again, the control method for the modular robot further includes the following step:

T7: storing the initial virtual configuration, the initial virtual configuration information and the preset action control information. After the preset action control information is generated, the initial virtual configuration, the initial virtual configuration information and the preset action control information are associatively stored in a database, and assembly may be performed based on the initial virtual configuration stored in the database. The assembled configuration is compared with the initial virtual configuration stored in the database, and corrected. When configuration information of the assembled configuration is consistent with the initial virtual configuration information stored in the database, the corresponding associated preset action control information can be directly retrieved from the database to execute an action; or when enough initial virtual configurations are stored in the database, configuration information of a randomly assembled configuration is matched with each piece of the initial virtual configuration information in the database. When the configuration information of the randomly assembled configuration is identical with certain initial virtual configuration information, the corresponding associated preset action control information can be directly retrieved from the database to execute an action.

Figure 10:
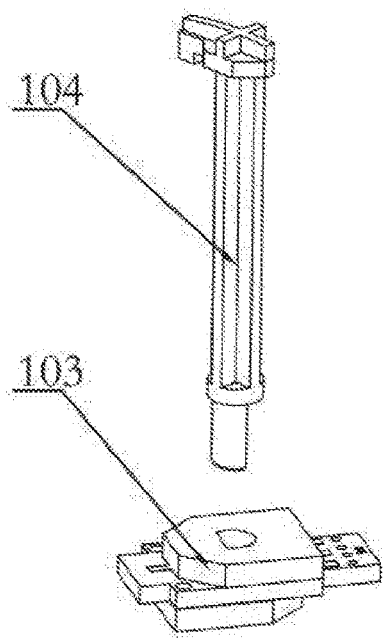
FIG. 10 is a schematic diagram of an exploded structure of an angle measurement device according to the fifth embodiment of the present disclosure.
Figure 11:
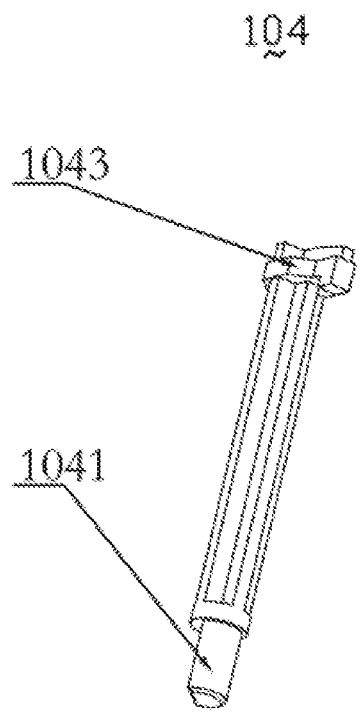
FIG. 11 is a schematic diagram of a three-dimensional structure of a rotating shaft according to the fifth embodiment of the present disclosure.

Referring to FIG. 10 and FIG. 11 together, each single cell body is provided with an angle measurement device 101, the angle measurement device 101 including a rotating shaft 104 and a sensor 103. The rotating shaft 104 includes a first end 1041 and a second end 1043 which face each other. The first end 1041 of the rotating shaft 104 is connected to the sensor 103. The second end 1043 of the rotating shaft 104 is connected to one of the sub-modules. The sensor 103 is connected to the other sub-module, so that the rotation between the two sub-modules can be detected by the sensor 103. A cross section of the first end 1041 of the rotating shaft 104 is preferably substantially "D-shaped". When being connected to the sensor 103, the rotating shaft 104 is inserted into the sensor 103 to play a foolproof role. When the rotating shaft 104 that has been removed is installed again, it needs to be installed from the same angle. The second end 1043 of the rotating shaft 104 is preferably in a pointer shape. When the rotating shaft 104 is connected to one of the sub-modules of the module unit, a foolproof effect is also achieved. When the rotating shaft 104 which has been removed is installed again, it needs to be installed from the same angle. Therefore, the sub-module connected to the rotating shaft 104 and the sensor 103 are moderately maintained at the same angle, and it is unnecessary to readjust the disassembled single cell body when it is assembled again. It may be understood that the shapes of the first end 1041 and the second end 1043 of the rotating shaft 104 are not completely limited to the shapes in the embodiment, and the first end 1041 and the second end 1043 of the rotating shaft 104 may also be other foolproof structures as long as the foolproof effect is achieved. The foolproof structure is a variant that is easily conceived by those skilled in the art, and will not be further described in this embodiment by way of example.

Figure 12:
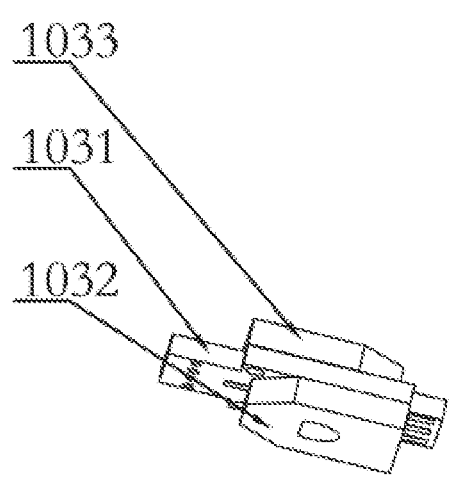
FIG. 12 is a schematic diagram of a three-dimensional structure of a sensor according to the fifth embodiment of the present disclosure.
Figure 13:
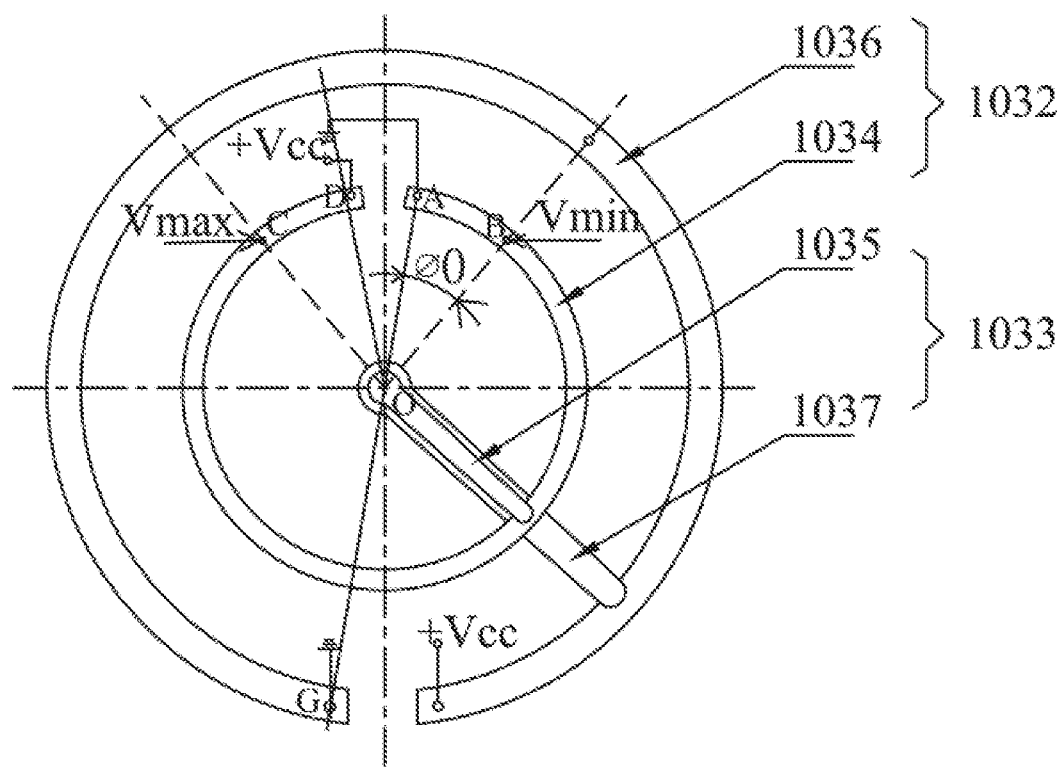
FIG. 13 is a schematic diagram of a measurement principle of the sensor according to the fifth embodiment of the present disclosure.

Referring to FIG. 12 and FIG. 13 together, the sensor 103 includes an angle measurement circuit board 1031, a first potentiometer 1032 and a second potentiometer 1033. The first potentiometer 1032 and the second potentiometer 1033 are electrically connected in parallel, and dead zones of the two potentiometers do not cover each other. The angle measurement circuit board 1031 is provided between the first potentiometer 1032 and the second potentiometer 1033. The first potentiometer 1032 and the second potentiometer 1033 are both connected to the angle measurement circuit board 1031. The first potentiometer 1032 and the second potentiometer 1033 are also electrically connected to the angle measurement circuit board 1031. The first potentiometer 1032 includes a first resistor 1034 and a first slider 1035. The second potentiometer 1033 includes a second resistor 1036 and a second slider 1037. An end point of the first slider 1035 slides on the first resistor 1034. An end point of the second slider 1037 slides on the second resistor 1036. The first slider 1035 and the second slider 1037 are fixedly connected by an insulating material. The first slider 1035 and the second slider 1037 share one rotating shaft. That is, the first slider 1035 and the second slider 1037 are both connected to the first end 1041 of the rotating shaft 104, and rotate with the rotating shaft 104 as a center. A dead zone of the first resistor 1034 is covered by a non-dead zone of the second resistor 1036. A dead zone part of the second resistor 1036 is covered by a non-dead zone of the first resistor 1034. Input and output ports of the first potentiometer 1032 and the second potentiometer 1033 are integrated on the angle measurement circuit board 1031. The input and output ports include ports where the resistors are connected to a voltage Vcc, a grounding port, and output ports of the sliders. It may be understood that the angle measurement circuit board 1031 may not be provided, while the first potentiometer 1032 and the second potentiometer 1033 are directly electrically connected to a main circuit board (not shown) of the single cell body, function modules of the angle measurement circuit board 1031 being integrated on the main circuit board.

In order to measure more accurately, the dead zones of the potentiometers in this embodiment of the present disclosure are defined to include two areas: 1. an area that cannot be directly measured by a single potentiometer, that is, an area between two end points of the resistor, such as an inferior arc AOD in FIG. 7; and 2. an area of two sections of the single potentiometer near the end points, which has low measurement accuracy, such as an inferior arc AOB and an inferior arc COD in FIG. 7, wherein two critical end points B and C in the area with low measurement accuracy correspond to a minimum voltage and a maximum voltage which are output by the slider. Then, the dead zone of the first potentiometer 1032 in FIG. 7 is defined as an inferior arc BOC area.

The principle of 360-degree angle measurement of a non-dead zone angle measurement device 101 based on dual potentiometers of the present disclosure is implemented as follows:

the center of the rotating shaft shared by the two sliders is labelled as O, an end of the first resistor 1034 connected to the voltage Vcc is labelled as D, a grounding end of the first resistor 1034 is labelled as A, and a grounding end of the second resistor 1036 is labelled as G. The minimum voltage and the maximum voltage output by the first potentiometer 1032 are set as Vmin and Vmax, respectively, wherein Vmin to Vmax is an output voltage range in which the first potentiometer 1032 measures the rotation angle of the first slider 1035 with relatively high accuracy.

When the DC voltage output of the first slider 1035 is set as Vmin, a point of the first slider 1035 on the first resistor 1034 is set as B, and meanwhile a point of the second slider 1037 on the second resistor 1036 is set as F. When the DC voltage output of the first slider 1035 is set as Vmax, a point of the first slider 1035 on the first resistor 1034 is set as C, and meanwhile a point of the second slider 1037 on the second resistor 1036 is set as E.

If ∠AOB=ϕ0, the DC voltage output of the first slider 1035 corresponding to point C is Vmax, $$\phi_0 = \frac{V_{min}}{k_1}, \quad (2)$$

wherein, k1 is an angular voltage division coefficient of the first resistor 103411.

Moreover, a ray OBF is defined as a zero initial line for angle measurement. That is, when the first slider 1035 and the second slider 1037 coincide with the OBF, an angle φ measured at this time is defined as 0. When a voltage value V1 measured by the first slider 1035 satisfies the following formula (3):

$$V_{min} \leq V_1 \leq V_{max}. \quad (3)$$

That is, when the first slider 1035 slides on a major arc BOC, the measured angle ϕ is expressed by the following formula (4) using a principle of resistance voltage division of the first resistor 1034 at this time:

$$\phi = \frac{V_1}{k_1} - \phi_0. \quad (4)$$

When the voltage value V1 measured by the first slider 1035 does not satisfy the formula (3), that is, when the first slider 1035 does not slide on the major arc BOC, the second slider 1037 just slides on an inferior arc EOF of the second resistor 1036. The DC output voltage of the second slider 1037 is measured as V2. The angle φ measured at this time can be expressed by the following formula (5) using the principle of resistance voltage division on the second resistor 1036:

$$\phi = \frac{V_2}{k_2} - \angle EOG + \frac{V_{max}}{k_1} - \phi_0. \quad (5)$$

wherein, k2 is an angular voltage division coefficient of the second resistor 103621.

According to a voltage VEOG output by the second slider 1037 at point E, the following formula can be obtained:

$$\angle EOG = \frac{V_{EOG}}{K_2'}.$$

According to the minimum voltage and the maximum voltage output by the first potentiometer 1032, the dead zone of the first potentiometer 1032 is an inferior arc BOC area, and the non-dead zone of the second potentiometer 1033 is set to cover the inferior arc BOC area.

Based on the non-dead zone angle measurement device 10, the method for non-dead zone angle measurement provided by the present disclosure specifically includes:

(1) obtaining ∠AOB and ∠EOG by measurement; and (2) acquiring the output voltage V1 of the first slider 1035, and determining whether V1 satisfies formula (3); if so, determining the angle φ according to formula (4); and if not, acquiring the output voltage V2 of the second slider 1037, and then determining the angle φ according to formula (5).

Embodiment 6

Figure 14:
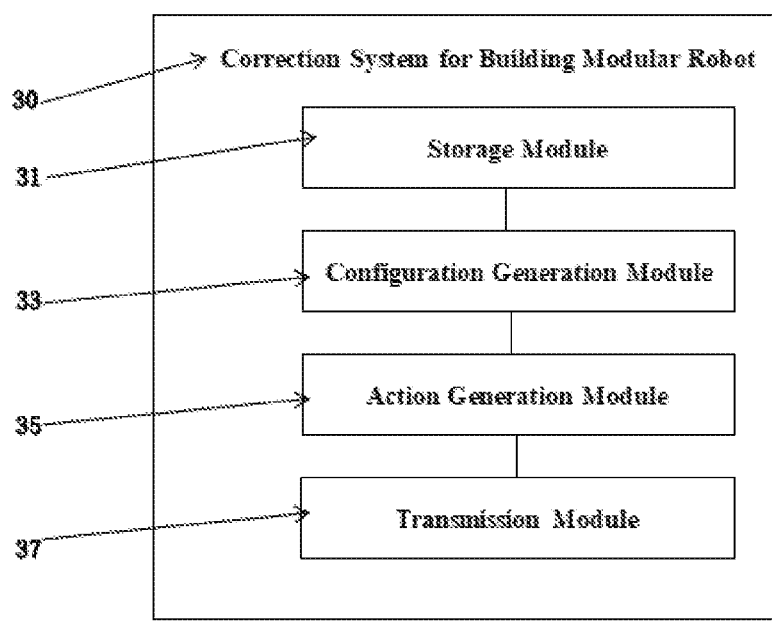
FIG. 14 is a schematic diagram of a module structure of a control system for a modular robot according to a sixth embodiment of the present disclosure.

Referring to FIG. 14, a sixth embodiment of the present disclosure further provides a control system 30 for a modular robot, which is configured to control an initial entity structure assembled by a plurality of module units. The control system 30 for the modular robot includes:

a storage module 31 configured to store initial virtual configuration information of the initial entity structure;

a configuration generation module 33 configured to generate an initial virtual configuration of the modular robot based on the initial virtual configuration information;

an action generation module 35 configured to generate preset action control information; and a transmission module 37 configured to transmit the preset action control information to the modular robot, such that the modular robot performs actions according to the preset action control information.

The storage module 31 is connected to the modular robot to store the initial virtual configuration information of the initial entity structure. The configuration generation module 33 is connected to the storage module 31 to acquire the initial virtual configuration information from the storage module 31, thereby generating the initial virtual configuration of the modular robot. The action generation module 35 is connected to the configuration generation module 33 to obtain an initial virtual configuration, and generate the preset action control information according to the initial virtual configuration. The transmission module 37 is connected to the action generation module 35 and the modular robot. The transmission module 37 acquires the preset action control information from the action generation module 35 and transmits the preset action control information to the modular robot. The modular robot performs actions according to the preset action control information.

Embodiment 7

Figure 15:
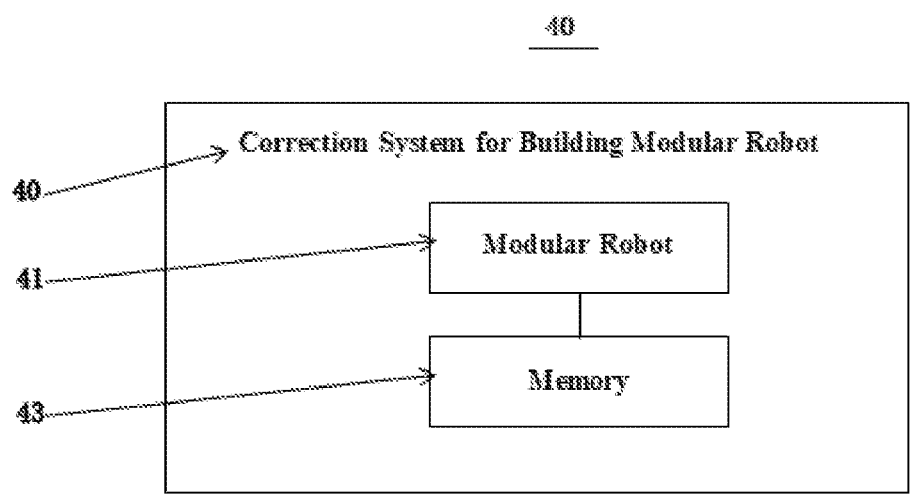
FIG. 15 is a schematic diagram of a module structure of a control system for a modular robot according to a seventh embodiment of the present disclosure.

Referring to FIG. 15, a seventh embodiment of the present disclosure further provides a control system for a modular robot. The control system for the modular robot includes:

a modular robot 41 which is assembled by a plurality of module units and has an initial entity structure; and a memory 43, and one or more programs stored in the memory, wherein the memory communicates with the module units, and the programs are configured to execute the following step instructions:

acquiring and storing initial virtual configuration information of the initial entity structure;

generating an initial virtual configuration of the modular robot based on the initial virtual configuration information;

setting action frames to generate preset action control information; and transmitting the preset action control information to the modular robot.

In addition, the plurality of module units includes a cell body and at least one single cell body. Each docking part has unique interface identification information. The single cell body directly connected to the cell body is defined as a first-level single cell body. Acquiring the initial virtual configuration information of the initial entity structure specifically includes the following steps:

transmitting a signal by the cell body to the first-level single cell body connected thereto through the docking part;

receiving the signal and then performing face recognition by the first-level single cell body to obtain interface identification information of the docking part, that sends a signal, of the cell body; and transmitting, by the first-level single cell body, the interface identification information of the docking part, that sends the signal, of the cell body and the interface identification information of the docking part, that receives the signal, of said first-level single cell body itself to the cell body so as to obtain position information of the first-level single cell body.

When the method for calculating the position of the module unit of the modular robot of the present disclosure is compared with the prior art, the modular robot includes at least two module units, each module unit including at least two docking parts. The module units are connected by the respective docking parts. Each docking part has unique interface identification information. The method for calculating the position of the module unit of the modular robot includes the following step: recognizing configuration information of the modular robot, wherein position information in the configuration information is calculated by recognizing the interface identification information of the docking parts by which adjacent module units are connected. The method for calculating the position of the module unit of the modular robot of the present disclosure is characterized in that the position information of the module units is determined by recognizing the interface identification information of docking parts of adjacent module units, and has the advantage of precise and quick recognition, thereby ensuring the accuracy of a position calculation result of each module unit, and facilitating the widespread application of the modular robot.

In addition, in this method, the face recognition action is completed by transmitting electrical signals, which further improves the recognition accuracy, is simple and fast, and has low hardware requirements.

In addition, in this method, the single cell bodies respond to the cell body with their position information in a time sequence, which avoids position calculation errors caused by confusion in the response information, and further ensures the accuracy of the position calculation results.

In addition, in this method, after the single cell bodies make a response with their position information, the cell body will individually number the respective single cell bodies and store the numbers in association with position information, thereby further avoiding confusion of information and further ensuring the accuracy of the calculation results.

The modular robot of the present disclosure also has the above-mentioned advantages.

The foregoing descriptions are merely preferred embodiments of the present disclosure, and are not intended to limit the present disclosure. Within the principles of the present disclosure, any modifications, equivalent substitutions, improvements, etc., are within the protection scope of the present disclosure.

The invention claimed is:

1. A method for calculating a position of a module unit of a modular robot, wherein the modular robot comprises at least two module units, and each module unit comprises at least two docking parts; the module units being connected by the docking parts, each docking part having unique interface identification information; the method for calculating the position of the module unit of the modular robot comprising the following steps:

recognizing configuration information of the modular robot, wherein position information in the configuration information is calculated by recognizing the interface identification information of the docking parts by which adjacent module units are connected;

wherein the at least two module units comprise a cell body and at least one single cell body, and the single cell body directly connected to the cell body is defined as a first-level single cell body; and recognizing the position information of the adjacent module units specifically comprising the following steps:

transmitting a signal by the cell body to the first-level single cell body connected thereto through the docking part;

receiving the signal and then performing face recognition by the first-level single cell body to obtain the interface identification information of the docking part, that sends the signal, of the cell body; and transmitting, by the first-level single cell body, the interface identification information of the docking part, that sends the signal, of the cell body and the interface identification information of the docking part, that receives the signal, of the first-level single cell body itself to the cell body so as to obtain position information of the first-level single cell body.

2. The method for calculating the position of the module unit of the modular robot according to claim 1, wherein each module unit comprises two sub-modules that are movable relatively, and recognizing the configuration information of the modular robot further comprises: recognizing one or more of module type information and module quantity information of the adjacent module units, and initial angle information between the two sub-modules in each module unit.

3. The method for calculating the position of the module unit of the modular robot according to claim 1, wherein recognizing the configuration information of the modular robot comprises: individually numbering the respective module units, and storing the position information of each module unit in association with the corresponding number.

4. The method for calculating the position of the module unit of the modular robot according to claim 1, wherein the specific process of recognizing the position information of the adjacent module units is as follows:

one module unit sending a signal to at least one module unit directly connected thereto; and the at least one module unit recognizing the interface identification information of the docking part of the module unit that sends the signal, and calculating the position information thereof based on the interface identification information of the docking part of the module unit that sends the signal and the interface identification information of the docking part, which receives the signal, of the at least one module unit itself.

5. The method for calculating the position of the module unit of the modular robot according to claim 1, wherein the single cell body connected to the first-level single cell body is defined as a second-level single cell body, and the single cell body connected to an $M^{th}$-level single cell body is defined as a $(M+1)^{th}$-level single cell body, M being an integer greater than or equal to 1; and recognizing the position information of the adjacent module units further comprising the following steps:

sending a signal by the $M^{th}$-level single cell body to the $(M+1)^{th}$-level single cell body; and receiving the signal and then performing face recognition by the $(M+1)^{th}$-level single cell body to obtain the interface identification information of the docking part, that sends the signal, of the $M^{th}$-level single cell body; and transmitting, by the $(M+1)^{th}$-level single cell body, the interface identification information of the docking part, that sends the signal, of the $M^{th}$-level single cell body and the interface identification information of the docking part, that receives the signal, of the $(M+1)^{th}$-level single cell body itself to the cell body.

6. The method for calculating the position of the module unit of the modular robot according to claim 5, wherein when the cell body or the single cell body simultaneously sends different electrical signals to a plurality of lower-level single cell bodies, the plurality of lower-level single cell bodies responds to the cell body with their position information based on a time sequence according to the interface identification information of the docking part, that transmits different electrical signals, of the cell body or a higher-level single cell body; or when the cell body or the single cell body sends the same or different electrical signals to a plurality of lower-level single cell bodies in a time sequence, the plurality of lower-single cell bodies sequentially responds to the cell body with their position information according to a time sequence in which the electrical signals are received.

7. The method for calculating the position of the module unit of the modular robot according to claim 5, wherein before or at the same time when the first-level single cell body sends an electrical signal, the following step is performed:

stopping sending the electrical signal by the cell body, and instructing by the cell body the first-level single cell body to send the electrical signal to the second-level single cell body.

8. The method for calculating the position of the module unit of the modular robot according to claim 1, wherein before or at the same time when the cell body transmits the electrical signals, the cell body sends a broadcast signal for instructing all single cell bodies to prepare for face recognition.

9. A modular robot having a position calculation function, wherein the modular robot comprises at least two module units, and each module unit comprises at least two docking parts; the module units being connected by the respective docking parts, each docking part being provided with an interface which has unique interface identification information; the modular robot needing to complete configuration information recognition during or after an assembly process, wherein position information in the configuration information is calculated by recognizing the interface identification information of the docking parts by which adjacent module units are connected;

wherein the at least two module units comprise a cell body and at least one single cell body, and the single cell body directly connected to the cell body is defined as a first-level single cell body; and recognizing the position information of the adjacent module units specifically comprising the following steps:

transmitting a signal by the cell body to the first-level single cell body connected thereto through the docking part;

receiving the signal and then performing face recognition by the first-level single cell body to obtain the interface identification information of the docking part, that sends the signal, of the cell body; and transmitting, by the first-level single cell body, the interface identification information of the docking part, that sends the signal, of the cell body and the interface identification information of the docking part, that receives the signal, of the first-level single cell body itself to the cell body so as to obtain position information of the first-level single cell body.

* * * * *